US009092951B2

(12) United States Patent
Kyle

(10) Patent No.: US 9,092,951 B2
(45) Date of Patent: Jul. 28, 2015

(54) SURVEILLANCE CAMERA ASSEMBLY FOR A CHECKOUT SYSTEM

(75) Inventor: David M. Kyle, Decatur, GA (US)

(73) Assignee: NCR Corporation, Duluth, FL (US)

( * ) Notice: Subject to any disclaimer, the term of this patent is extended or adjusted under 35 U.S.C. 154(b) by 1727 days.

(21) Appl. No.: 12/243,207

(22) Filed: Oct. 1, 2008

(65) Prior Publication Data

US 2010/0079593 A1 Apr. 1, 2010

(51) Int. Cl.
*H04N 7/18* (2006.01)
*G07G 1/00* (2006.01)
*G08B 13/24* (2006.01)
*A47F 9/04* (2006.01)

(52) U.S. Cl.
CPC ............ *G07G 1/0036* (2013.01); *G08B 13/248* (2013.01); *A47F 9/046* (2013.01)

(58) Field of Classification Search
USPC .......................................................... 348/150
See application file for complete search history.

(56) References Cited

U.S. PATENT DOCUMENTS 4,510,526 A * 4/1985 Coutta et al. .................. 348/143
5,790,181 A * 8/1998 Chahl et al. ...................... 348/36
2001/0015751 A1* 8/2001 Geng .............................. 348/36
2002/0024599 A1* 2/2002 Fukuhara et al. ............. 348/169
2003/0018522 A1* 1/2003 Denimarck et al. ............ 705/14
2003/0071891 A1* 4/2003 Geng .............................. 348/39
2003/0075602 A1* 4/2003 Wike et al. .................... 235/383
2003/0078849 A1* 4/2003 Snyder ............................ 705/23
2003/0081952 A1* 5/2003 Geng ............................ 396/427
2003/0120547 A1* 6/2003 Walter et al. .................... 705/16
2003/0122667 A1* 7/2003 Flynn ............................ 340/540
2003/0160863 A1* 8/2003 Kakou et al. ..................... 348/46
2005/0097064 A1* 5/2005 Werden ......................... 705/400
2005/0189411 A1* 9/2005 Ostrowski et al. ............ 235/383
2005/0269405 A1* 12/2005 Throckmorton et al. ...... 235/383
2006/0023105 A1* 2/2006 Kostrzewski et al. ........ 348/335
2006/0261157 A1* 11/2006 Ostrowski et al. ............ 235/383
2007/0070190 A1* 3/2007 Yin et al. ........................ 348/36
2007/0205277 A1* 9/2007 Tashiro ......................... 235/383
2007/0253208 A1* 11/2007 Howard et al. ............... 362/431
2008/0027817 A1* 1/2008 Iizaka et al. ..................... 705/20
2008/0061139 A1* 3/2008 Roquemore .................. 235/383
2008/0087724 A1* 4/2008 Kobres et al. ................. 235/383
2008/0122922 A1* 5/2008 Geng .............................. 348/39
2008/0134155 A1* 6/2008 Miller ........................... 717/139
2008/0247061 A1* 10/2008 Simkulet et al. .............. 359/730
2008/0249883 A1* 10/2008 Daily .............................. 705/23
2009/0034086 A1* 2/2009 Montgomery et al. ........ 359/629
2009/0073254 A1* 3/2009 Li et al. ........................... 348/36
2009/0272801 A1* 11/2009 Connell et al. ................ 235/383
2010/0103535 A1* 4/2010 Simkulet et al. .............. 359/730
2010/0201781 A1* 8/2010 Trubko et al. ................... 348/36
2010/0220191 A1* 9/2010 Throckmorton et al. ...... 348/150
2011/0018964 A1* 1/2011 Krishnan et al. ................ 348/36
2011/0211039 A1* 9/2011 Krishnan et al. ................ 348/36

FOREIGN PATENT DOCUMENTS

JP 2000082846 A * 3/2000

* cited by examiner

*Primary Examiner* — Angela Nguyen
(74) *Attorney, Agent, or Firm* — Paul W. Martin; Joseph P. Mehrle

(57) ABSTRACT

A surveillance camera assembly for a checkout system which captures images of a checkout environment. The surveillance camera assembly includes a panoramic mirror and a camera for capturing images of a checkout environment. The camera sends the images to a security computer.

14 Claims, 3 Drawing Sheets

SURVEILLANCE CAMERA ASSEMBLY FOR A CHECKOUT SYSTEM

BACKGROUND

One problem associated with checkout operations is the need to prevent theft. This concern is applicable in employee operated systems, but is of particular importance in the context of customer operated self checkout systems. If a transaction is not closely monitored, numerous opportunities exist for an unscrupulous customer to take merchandise without entering it into a transaction.

It would be desirable to provide a surveillance camera assembly for a checkout system to address these concerns.

SUMMARY

A surveillance camera assembly for a checkout system is provided.

A surveillance camera assembly for a checkout system which includes a camera for capturing images of a checkout environment and a panoramic mirror for directing the images to the camera. The camera sends the images to a security computer.

DETAILED DESCRIPTION

Figure 1:
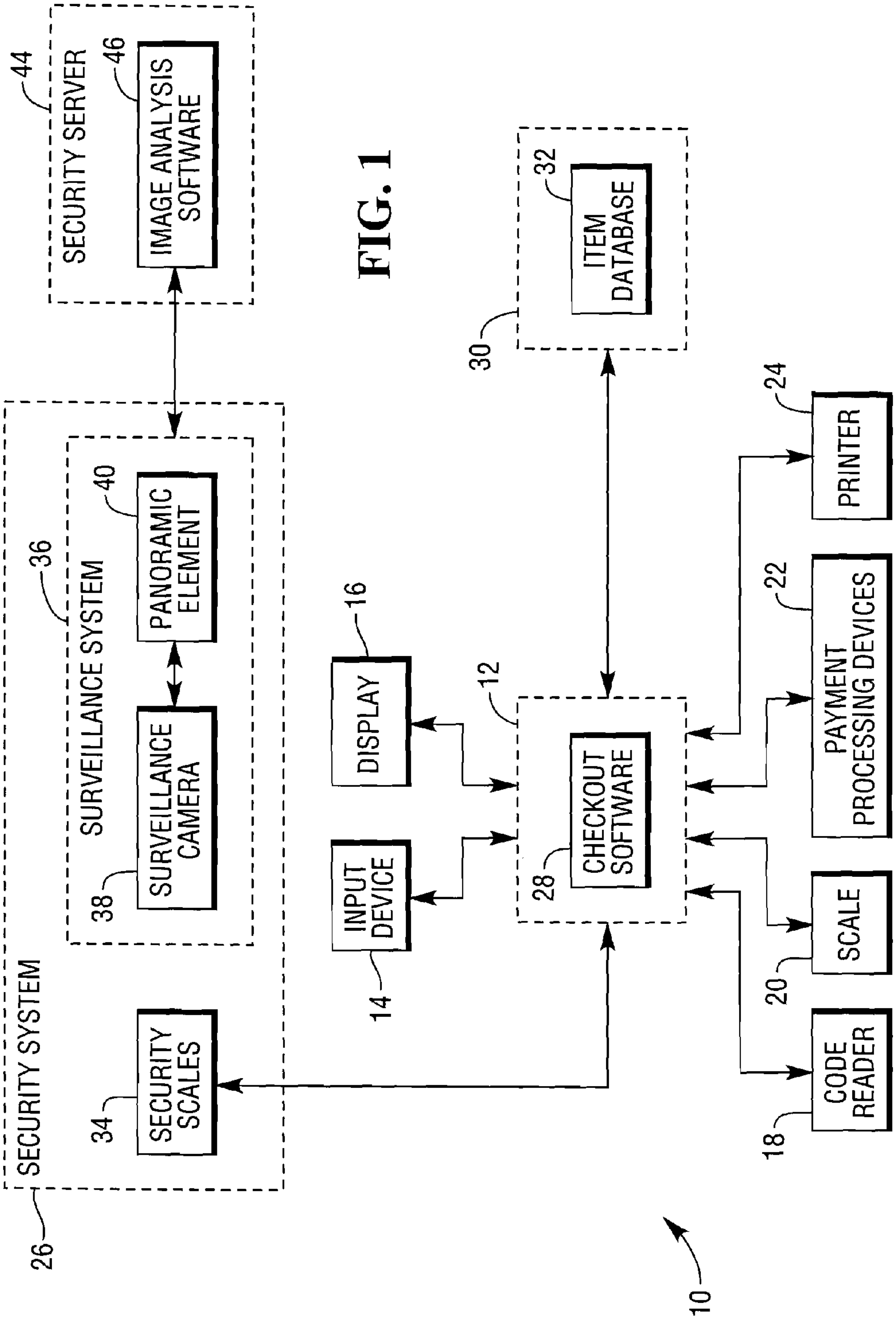
FIG. 1 illustrates an example checkout system according to an aspect of the present invention.

With reference to FIG. 1, checkout system 10 includes computer 12, input device 14, display 16, code reader 18, scale 20, payment processing device 22, printer 24, and security system 26.

Computer 12 includes a processor, operating memory, and long term storage. Computer executes checkout software 28, which records item identification information via input device 14 or code reader 18, item weight information (in the case of produce items) via scale 20, obtains item price information from item database 32, tallies prices of purchased items, records payment for the purchased items, and prints a receipt evidencing the payment for the purchased items via printer 24.

Input device 14 may include a keyboard.

Display 16 may include a liquid crystal display (LCD). Alternatively, input device 14 and display 16 may be combined as a touch screen.

Code reader 18 reads item identification information stored in codes on purchased items. Code reader 18 may include a barcode reader (e.g., a laser-based barcode reader and/or an imager-based barcode reader) or radio frequency identification (RFID) tag reader or both. Code reader 18 may be fixed mounted or portable or include both.

Scale 20 records weights of produce items. Scale 20 includes one or more load cells and a weigh plate. Scale 20 and code reader 18 may be combined into a single peripheral.

Payment processing device 22 may read payment, loyalty, and identification cards. Payment processing device 22 may include one or more payment peripherals, including a card (e.g., credit, debit, smart, loyalty, check) reader, cash (e.g., coin and/or currency) acceptor, cash (e.g., coin and/or currency) dispenser, cash drawer, and signature capture device.

Printer 24 may print receipts, coupons, vouchers, ads, and promotions. Printer 24 may include a thermal printer capable of printer on one or both sides of paper roll stock.

Security system 26 includes security scales 34 and surveillance system 36. Security scales 34 may be located in bag wells and set aside shelves and be controlled by computer 12.

Surveillance system 36 includes surveillance camera 38 and panoramic element 40. Surveillance camera 38 captures images of customer activity, including customer handling of products, during transactions at checkout system 10 and neighboring checkout systems 10. Panoramic element 40 provides surveillance camera 38 with visibility around checkout system 10.

Surveillance camera 38 may be controlled independently of computer 12. Images from camera 38 may be captured by computer 12 or a separate computer, such as security server 44. Security server 44 may execute image analysis software 46 for analyzing the images for improper customer behavior and alerting security personnel. Surveillance camera 38 may be a network device, with its own internet protocol (IP) address. Surveillance camera 38 may alternatively be controlled by computer 12, for example, via a universal serial bus (USB) connection.

Figure 2:
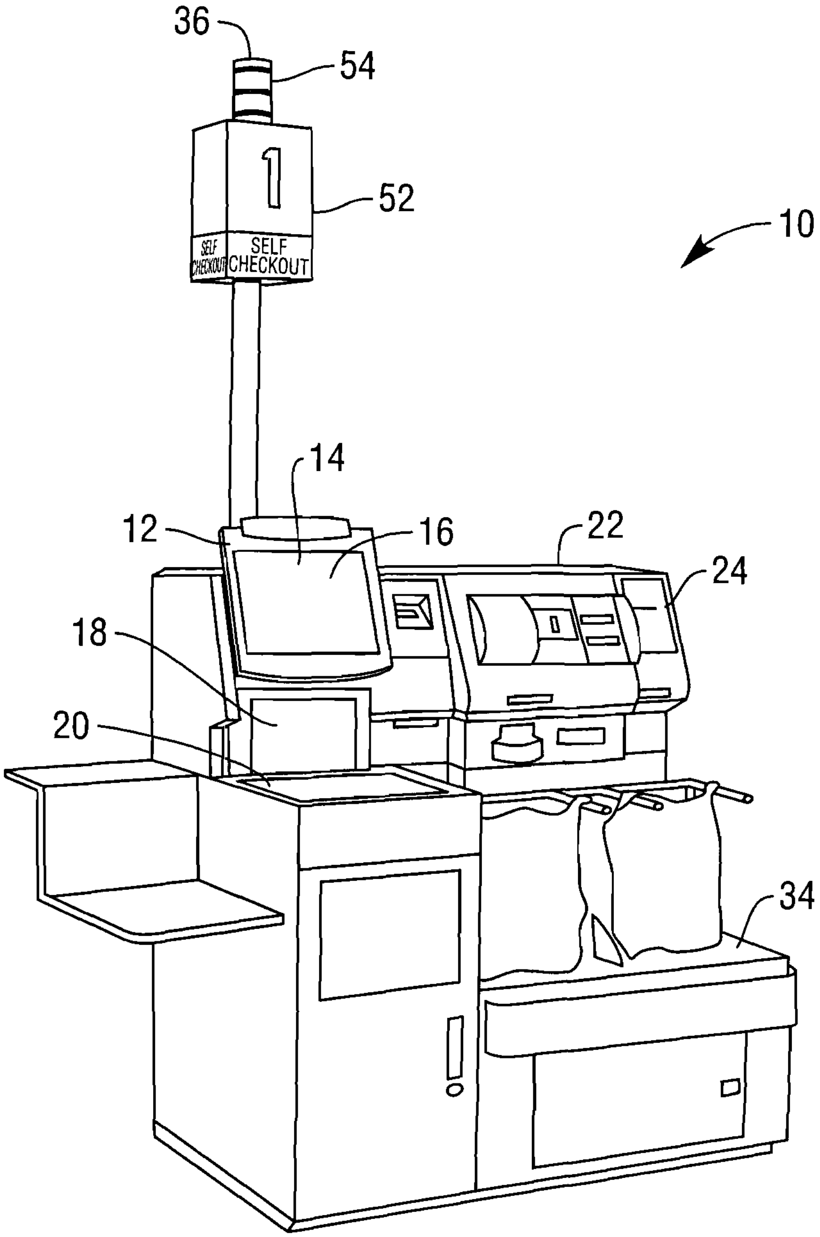
FIG. 2 illustrates an example embodiment of a checkout station.

With reference to FIG. 2, an example embodiment of a checkout station 50 is illustrated. In addition to computer 12, input device 14, display 16, code reader 18, scale 20, payment processing device 22, printer 24, and security system 26, checkout station 50 includes lane indicator 52.

Lane indicator 52 includes a light portion 62 controlled by computer 12 for summoning a store attendant, such as a customer service manager, if intervention into a current checkout transaction is needed. Intervention may be required to assist a customer. Alternatively, intervention may be required for security or maintenance reasons.

In this example embodiment, lane indicator 52 further includes surveillance system 36.

Lane indicator 52 may also include a sign 54 with a reference numeral corresponding to the identity of checkout system 10 among a plurality of checkout systems 10.

Figure 4:
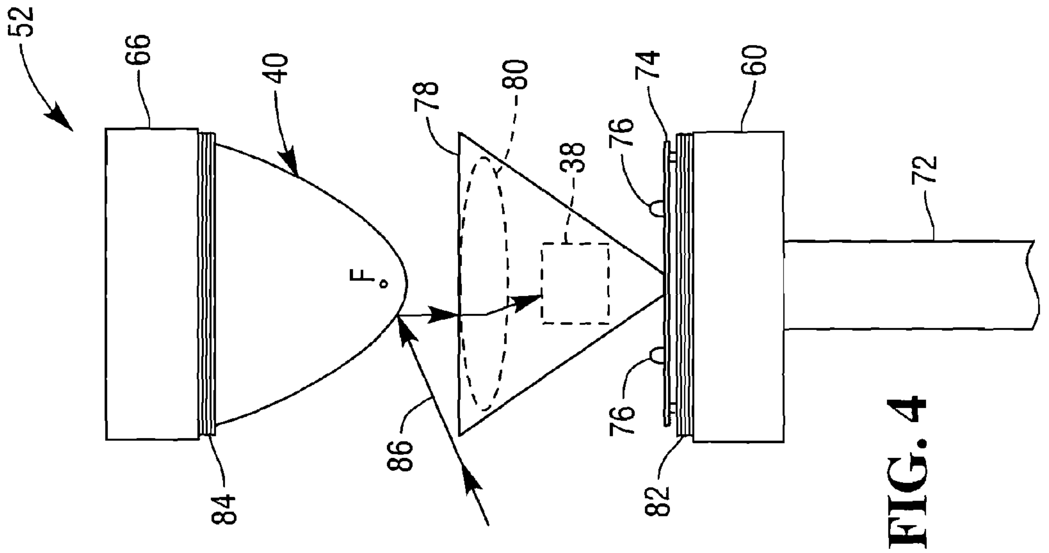
FIGS. 3-4 illustrate an example light indicator including a surveillance system.
Figure 3:
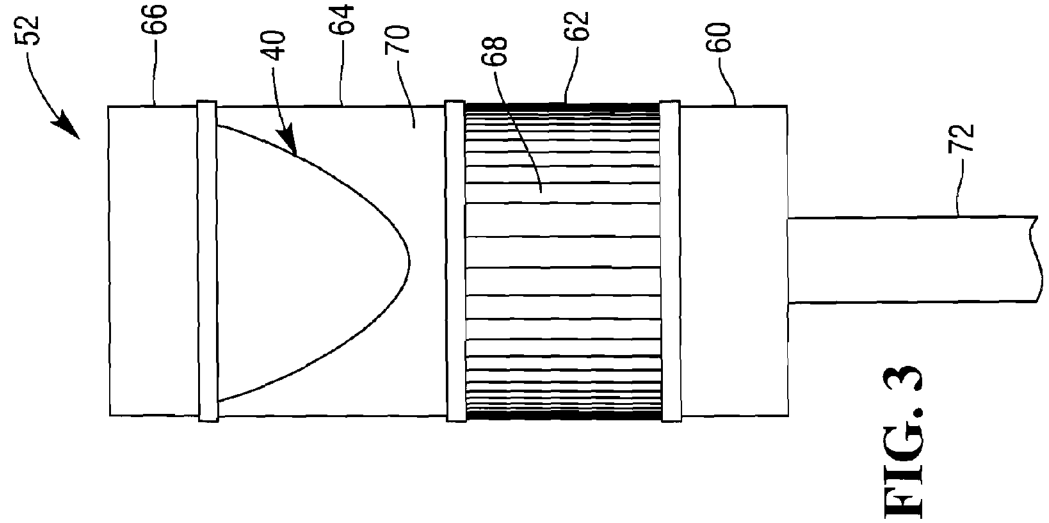

With reference to FIGS. 3-4, an example lane indicator 52 is illustrated.

Example lane indicator 52 includes base 60, light portion 62, surveillance portion 64, and top 66. Example lane indicator 52 is substantially cylindrical in shape.

Base 60 provides a bottom mounting platform and mounts to pole 72.

Light portion 62 is capable of producing one or more different colors of light associated with different assistance scenarios. Light portion 62 includes printed circuit board 74, which is mounted to base 60.

Lights 76 and conical section 78 are mounted to printed circuit board 74. Lights 76 may include light emitting diodes. Conical section 78 is mounted at or near the center of printed circuit board 74 and has a mirrored surface for changing the direction of light from lights 76 towards diffuser 68.

Diffuser 68 scatters light from light portion 62 evenly around light 54. Diffuser 68 is general cylindrical in shape, but the outer surface includes triangular protrusions that accomplish the scattering. FIG. 4 illustrates lane indicator 52 with diffuser 68 removed.

Light section 62 may further include portions of surveillance system 36. Camera 38 and focusing lens 80 are located within conical section 78, which is hollow, with the aperture of camera 38 pointing upwards. Electrical connections between camera 38 and printed circuit board 74 are made through an aperture in the bottom of conical section 78.

Surveillance portion 64 includes panoramic element 40 and window 70. In this example, panoramic element 40 includes a panoramic mirror. Panoramic element 40 gives camera 38 a visibility of 360° around checkout system 10. Panoramic element 40 may be shaped like a three-dimensional parabolic surface with its vertex oriented below its circular end and its focal point F above the vertex. Use of a parabola shape results in all light directed to focal point F reflecting in a substantially vertical direction downwards towards focusing lens 80. Panoramic element 40 is centered over camera 38. FIG. 4 illustrates lane indicator 52 with window 70 removed.

Panoramic element 40 may alternatively include a hyperbolic mirror assembly.

The diameter of lens 80 is substantially as large as the diameter of panoramic element 40 in order to maximize the amount of light captured from panoramic element 40.

Window 70 is substantially transparent. Window 70 and diffuser 68 may be one unit or coupled together. The bottom end of diffuser 68 may be threaded for coupling to corresponding threads 82 of base 60. The top end of window 70 may be threaded for coupling to corresponding threads 84 of top 66. Other assembly methods are also envisioned.

Example light ray 86 passes through window 70 and reflects vertically downward from panoramic mirror 78 to focusing lens 80. Focusing lens 80 concentrates the light towards camera 38.

Dimensions of elements in lane indicator 52 may be established to minimize the amount of area around pole 72 that is not visible to camera 38. In the example lane indicator 52, the height of pole 72, the diameter of panoramic section 64, the distance between camera 38 and the vertex of panoramic mirror 78, and the size and position of may be established consistent with a desired viewing area around pole 72. In the illustrated example, the non-viewable area may be as much as a conic of about 30 degrees (15 degrees rotated about the central axis).

Image analysis software 46 processes information captured by camera 38. For example, image analysis software 46 may complete a pixel for pixel mapping from a polar coordinate space to a Cartesian or rectangular coordinate space.

Although particular reference has been made to certain embodiments, variations and modifications are also envisioned within the spirit and scope of the following claims.

What is claimed is:

1. A camera assembly for a checkout system comprising:
- a camera aimed in a direction away from a checkout environment for capturing images of the checkout environment;
- a lens; and
- a panoramic mirror separate from the lens for directing the images to the camera through the lens wherein the focal point for the panoramic mirror is oriented below its circular end and above its vertex and wherein light directed to the focal point is reflected in a substantially vertical direction toward the lens, wherein the camera and the lens are situated within a conical section that is hollow and an aperture of the camera pointing upward and a checkout environment direction for the checkout environment is downward;
- wherein the camera sends the images to a security computer.

2. The camera assembly of claim 1, wherein the panoramic mirror comprises a parabolic mirror.

3. The camera assembly of claim 1, wherein the panoramic mirror comprises a hyperbolic mirror.

4. A checkout lane indicator comprising:
- a security portion including
  - a camera aimed in a direction away from a checkout environment for capturing images of the checkout environment;
  - a lens; and
  - a panoramic mirror separate from the lens for directing the images to the camera through the lens wherein the focal point for the panoramic mirror is oriented below its circular end and above its vertex and wherein light directed to the focal point is reflected in a substantially vertical direction toward the lens, and wherein the camera and the lens are situated within a conical section that is hollow and an aperture of the camera pointing upward and a checkout environment direction for the checkout environment is downward; and
- a light portion adjacent the security portion including a light emitter.

5. The checkout lane indicator of claim 4, wherein the panoramic mirror comprises a parabolic mirror.

6. The checkout lane indicator of claim 4, wherein the panoramic mirror comprises a hyperbolic mirror.

7. The checkout lane indicator of claim 4, wherein the light portion further comprises:
- a printed circuit board, wherein the light emitter is mounted to the printed circuit board; and
- a conical mirror on the printed circuit board for changing a direction of light from the light emitter.

8. The checkout lane indicator of claim 4, wherein the light emitter comprises a light emitting diode.

9. The checkout lane indicator of claim 4, wherein the security portion further comprises a transparent window around the panoramic mirror.

10. The checkout lane indicator of claim 4, wherein the security portion is controlled by a security computer.

11. The checkout lane indicator of claim 7, wherein the light portion further comprises a diffuser for scattering the light.

12. The checkout lane indicator of claim 10, wherein the security computer comprises a checkout computer adjacent the checkout lane indicator.

13. The checkout lane indicator of claim 10, wherein the security computer comprises a server.

14. A checkout lane indicator comprising:
- a base;
- a light portion on the base including
  - a printed circuit board;
  - a plurality of light emitters on the printed circuit board;
  - a conical mirror on the printed circuit board for reflecting light from the light emitters; and
  - a diffuser window around the conical mirror; and
- a surveillance portion including:
  - a camera in the conical mirror aimed in a direction away from a checkout environment for capturing images of the checkout environment;
  - a lens;
  - a panoramic mirror separate from the lens for directing the images to the camera through the lens wherein the focal point for the panoramic mirror is oriented below its circular end and above its vertex and wherein light directed to the focal point is reflected in a substantially vertical direction toward the lens, and wherein the camera and the lens are situated within a conical section that is hollow and an aperture of the camera pointing upward and a checkout environment direction for the checkout environment is downward; and a transparent window around the panoramic mirror;

wherein the camera sends the images to a security computer.

* * * * *